(12) United States Patent
Pan et al.

(10) Patent No.: US 8,842,654 B2
(45) Date of Patent: Sep. 23, 2014

(54) METHOD AND APPARATUS FOR REALIZING COMPATIBILITY BETWEEN A WCDMA SYSTEM AND A GSM SYSTEM

(75) Inventors: Ming Pan, Shenzhen (CN); Jizhou Li, Shenzhen (CN); Haiying Ju, Shenzhen (CN)

(73) Assignee: ZTE Corporation, Shenzhen (CN)

(*) Notice: Subject to any disclaimer, the term of this patent is extended or adjusted under 35 U.S.C. 154(b) by 69 days.

(21) Appl. No.: 13/141,086

(22) PCT Filed: Nov. 30, 2009

(86) PCT No.: PCT/CN2009/075217
§ 371 (c)(1),
(2), (4) Date: Jun. 21, 2011

(87) PCT Pub. No.: WO2010/072114
PCT Pub. Date: Jul. 1, 2010

(65) Prior Publication Data
US 2011/0255497 A1   Oct. 20, 2011

(30) Foreign Application Priority Data
Dec. 25, 2008   (CN) .......................... 2008 1 0188353

(51) Int. Cl.
*H04J 3/16* (2006.01)
*H04W 88/08* (2009.01)
*H04L 29/06* (2006.01)
*H04W 88/10* (2009.01)

(52) U.S. Cl.
CPC ............. *H04W 88/085* (2013.01); *H04L 69/10* (2013.01); *H04W 88/10* (2013.01)
USPC .......................................... 370/342; 370/466

(58) Field of Classification Search
CPC ....... H04L 69/18; H04W 88/10; H04W 80/00
See application file for complete search history.

(56) References Cited

U.S. PATENT DOCUMENTS 7,460,513 B2 * 12/2008 Osterling ...................... 370/342
7,656,897 B2 * 2/2010 Liu ............................... 370/467
(Continued)

FOREIGN PATENT DOCUMENTS

CN    1728579 A    2/2006
CN    101175261 A    5/2008
(Continued)

OTHER PUBLICATIONS

International Search Report in international application No. PCT/CN2009/075217, mailed on Feb. 25, 2010.
English Translation of the Written Opinion of the International Search Authority in international application No. PCT/CN2009/075217, mailed on Feb. 25, 2010.
(Continued)

*Primary Examiner* — Gregory Sefcheck
(74) *Attorney, Agent, or Firm* — Oppedahl Patent Law Firm LLC

(57) ABSTRACT

The present invention provides a method for realizing compatibility between a WCDMA system and a GSM system, including: in the downlink data path of a base station, In-phase/Quadrature (IQ) data of the GSM system are mapped to the Common Public Radio Interface (CPRI) according to a predetermined rate before IQ data interleaving and framing the CPRI Base Frame (BF), and then the mapped data of the GSM system are de-multiplexed with IQ data of the WCDMA system; in the uplink data path of the base station, IQ data in the CPRI are de-multiplexed after de-framing and IQ data de-interleaving CPRI BFs, and then the de-multiplexed IQ data of the GSM system are de-mapped according to the predetermined rate. The present invention further provides an apparatus for realizing compatibility between a WCDMA system and a GSM system. The method and apparatus genuinely realize the compatibility between the WCDMA system and the GSM system by unifying two different radio transmission modes between the WCDMA system and the GSM system in the bottom layer.

7 Claims, 9 Drawing Sheets

(56) References Cited

U.S. PATENT DOCUMENTS

| | | | |
|---|---|---|---|
| 7,680,149 B2* | 3/2010 | Liu et al. | 370/466 |
| 7,940,667 B1* | 5/2011 | Coady et al. | 370/238 |
| 8,018,910 B2* | 9/2011 | Jiang et al. | 370/342 |
| 2005/0105534 A1* | 5/2005 | Osterling | 370/395.43 |
| 2005/0105552 A1* | 5/2005 | Osterling | 370/466 |
| 2007/0091896 A1* | 4/2007 | Liu | 370/395.5 |
| 2007/0116046 A1* | 5/2007 | Liu et al. | 370/466 |
| 2007/0165729 A1 | 7/2007 | Ha et al. | |
| 2007/0274279 A1* | 11/2007 | Wood et al. | 370/343 |
| 2008/0045254 A1* | 2/2008 | Gupta et al. | 455/509 |
| 2008/0070619 A1 | 3/2008 | Yu | |
| 2012/0147757 A1* | 6/2012 | Zhang | 370/244 |
| 2012/0204084 A1* | 8/2012 | Zhang | 714/807 |

FOREIGN PATENT DOCUMENTS

| | | |
|---|---|---|
| CN | 101325449 A | 12/2008 |
| CN | 101325499 A | 12/2008 |
| CN | 101325737 A | 12/2008 |
| CN | 101466172 A | 6/2009 |
| EP | 1816880 A1 | 8/2007 |
| EP | 1827035 A1 | 8/2007 |
| EP | 2161856 A1 | 3/2010 |
| WO | 2007037631 A1 | 4/2007 |

OTHER PUBLICATIONS

Supplementary European Search Report in European application No. 09834067.2, mailed on Mar. 16, 2012.

* cited by examiner

Prior Art

Prior Art

Prior Art

Prior Art

METHOD AND APPARATUS FOR REALIZING COMPATIBILITY BETWEEN A WCDMA SYSTEM AND A GSM SYSTEM

TECHNICAL FIELD

The invention relates to compatibility technologies between different mobile communication systems, especially to a method and apparatus for realizing compatibility between a Wideband Code Division Multiple Access (WCDMA) system and a Global System for Mobile Communications (GSM) system.

BACKGROUND

The WCDMA, as a trend of mobile communication development, is one of three major $3^{rd}$ generation (3G) mobile communication systems in the world at present. In view of long-term co-existence between a GSM system and a WCDMA system, it is necessary to realize radio transmission mode compatibility between the WCDMA system and the GSM system.

Along with development of 3G mobile communication technology, standardized baseband-radiofrequency interface turns out to be an increasing attention of manufacturers, and interface standards, such as Common Public Radio Interface (CPRI), Open Base Station Architecture Initiative (OBSAI) and the like, successively appear in recent years. Jointly developed by Ericsson, Huawei, NEC, NORTEL and Siemens, the CPRI protocol formulated for baseband-radiofrequency in radio communication base station are supported by most of manufacturers due to its economical efficiency and ease of use. CPRI protocol is developed mostly according to the standard of the WCDMA system, thus frame data of WCDMA system can be organized completely according to CPRI structure.

As shown in FIG. 1, when a CPRI rate is 1.2288 Gbps, first 16 bit in each CPRI Base Frame (BF) is used for transmitting signaling data and the latter 15*16 bit is used for transmitting In-phase/Quadrature (IQ) data. As shown in FIG. 2, when the CPRI rate is 2.4576 Gbps, first 32 bit in each CPRI BF is used for transmitting signaling data, the latter 15*32 bit is used for transmitting IQ data. At different CPRI rates, the durations of BFs are the same, and 256 BFs form 1 Hyper Frame (HF) of CPRI, 150 HFs aforementioned form a 10 ms CPRI radio frame, thus the duration of the CPRI BF is 25/96 μs.

As shown in FIG. 3, when the CPRI rate is 1.2288 Gbps, IQ data area of each 240 bit of CPRI BF is divided as 8 Antenna-Carrier (A×C) subchannels; each A×C subchannel is 30 bit. As shown in FIG. 4, when CPRI rate is 2.4576 Gbps, IQ data area of each 480 bit of CPRI BF is divided as 16 A×C subchannels; each A×C subchannel is also 30 bit The CPRI rate is defined as high rate, such as 1.2288 Gbps, 2.4576 Gbps and the like, according to CPRI protocol, while the character rate of burst pulse for transmitting data is defined as only 270.833 kbps by the regulation of GSM system. Therefore, it is a crucial concern that how to make different data rate modes between two different standards into a general system for designing dual-mode base stations comprising of the WCDMA system and the GSM system. Existing methods for realizing compatibility between the WCDMA system and the GSM system are realized by switching between two codes without unification in the bottom layer, which are not called as a genuine compatibility between the WCDMA system and the GSM system.

SUMMARY

The invention is directed to provide a method and apparatus for realizing compatibility between a WCDMA system and a GSM system, such that two different radio transmission modes between the WCDMA system and the GSM system are unified in the bottom layer.

To achieve the above objectives, the invention is disclosed with the following technical solutions:

A method for realizing compatibility between a Wideband Code Division Multiple Access (WCDMA) system and a Global System for Mobile Communication (GSM) system includes the following steps:

A, in a downlink data path of a base station, In-phase/Quadrature (IQ) data of the GSM system are mapped to a Common Public Radio Interface (CPRI) according to a predetermined rate before IQ data interleaving and framing a CPRI base frame, and the mapped IQ data of the GSM system are multiplexed with IQ data of the WCDMA system; and B, in an uplink data path of the base station, IQ data in the CPRI are de-multiplexed after performing de-framing and IQ data de-interleaving on CPRI base frames, and the de-multiplexed IQ data of the GSM system are de-mapped according to the aforementioned predetermined rate.

Further, in the aforementioned method, the predetermined rate may be the larger one of a downlink IQ data rate and an uplink IQ data rate of the GSM system.

Further, in the aforementioned method, the steps of mapping IQ data of the GSM system to the CPRI and multiplexing the mapped IQ data of the GSM system and IQ data of the WCDMA system may include:

A1, determining amount of CPRI base frames transmitted in the duration of a super frame of the GSM system;

A2, the CPRI base frames transmitted in the duration of the super frame are gradually divided, the amount of CPRI base frames contained in each unit in the last grade is N, wherein N is a positive integer;

A3, IQ data is multiplexed in the CPRI base frame, data area of each CPRI base frame is divided into K Antenna-Carrier (A×C) subchannels, wherein K is a positive integer; and A4, IQ data are multiplexed by using Y CPRI base frames as a multiplexing unit, wherein Y is a positive integer.

Further, in the aforementioned method, N may be exactly divided by Y.

Further, in the aforementioned method, IQ data of the same radio transmission mode may be transmitted via the same A×C subchannel of each base frame in one multiplexing unit.

The aforementioned method may further include:

according to data amount of the WCDMA system and the GSM system transmitted in the downlink data path of the base station, a control layer correspondingly adjusts the radio transmission mode of K A×C subchannels in the multiplexing unit.

An apparatus for realizing compatibility between a Wideband Code Division Multiple Access (WCDMA) system and a Global System for Mobile Communication (GSM) system includes:

a mapping module, configured to map In-phase/Quadrature (IQ) data of the GSM system received by a base station in a downlink data path to a CPRI according to a predetermined rate;

a multiplexing module, configured to multiplex the mapped IQ data of the GSM system with IQ data of the WCDMA system received by the base station in the downlink data path;

a de-multiplexing module, configured to de-multiplex IQ data in the CPRI in an uplink data path after being de-framed and IQ data de-interleaved; and a de-mapping module, configured to de-map uplink IQ data of the GSM system de-multiplexed by the de-multiplexing module in the uplink data path according to the predetermined rate.

Further, the mapping module of the aforementioned apparatus may include:

a base-frame amount determining submodule, configured to determine amount of CPRI base frames transmitted in the duration of a super frame of the GSM system; and a gradual dividing submodule, configured to gradually divide amount of CPRI base frames transmitted in the duration of the super frame of the GSM system determined by the base-frame amount determining submodule.

Further, the multiplexing module of the aforementioned apparatus may include:

a base-frame multiplexing submodule, configured to multiplex IQ data of the WCDMA system and IQ data of the GSM system in a CPRI base frame; and a multiplexing-unit multiplexing submodule, configured to multiplex IQ data of the WCDMA system and IQ data of the GSM system in a multiplexing unit.

Further, for the aforementioned apparatus, the predetermined rate may be the larger one of a downlink IQ data rate and an uplink IQ data rate of the GSM system.

By adopting the aforementioned technical solutions, the invention is advantageous in realizing the compatibility between the WCDMA system and the GSM system since two different radio transmission modes between the WCDMA system and the GSM system are unified in the bottom layer.

DETAILED DESCRIPTION

The present invention genuinely realizes compatibility between two different radio transmission modes in mobile communication by realizing the compatibility between a WCDMA system and a GSM system in bottom layer.

Due to the nonuniform rates of uplink and downlink IQ data of the GSM system, the present invention unifies uplink IQ data rate and downlink IQ data rate of the GSM system into the larger one of the two aforementioned IQ data rates.

Figure 1:
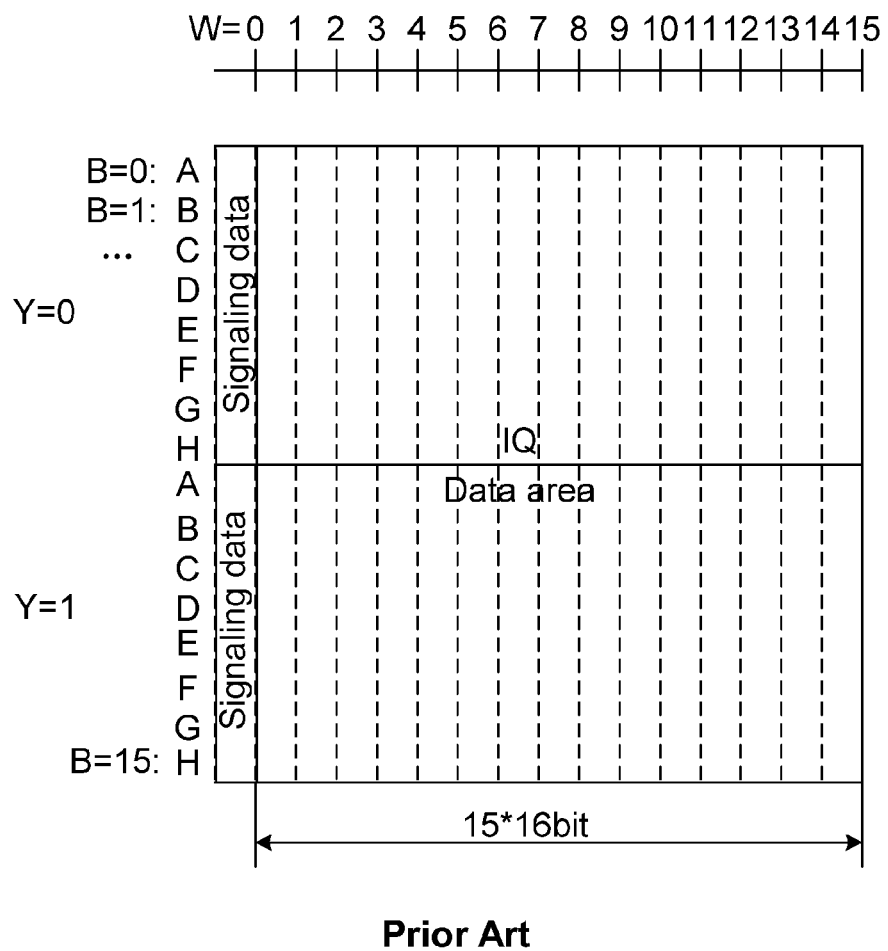
FIG. 1 is a structure diagram of CPRI base frame when the CPRI rate is 1.2288 Gbps.
Figure 2:
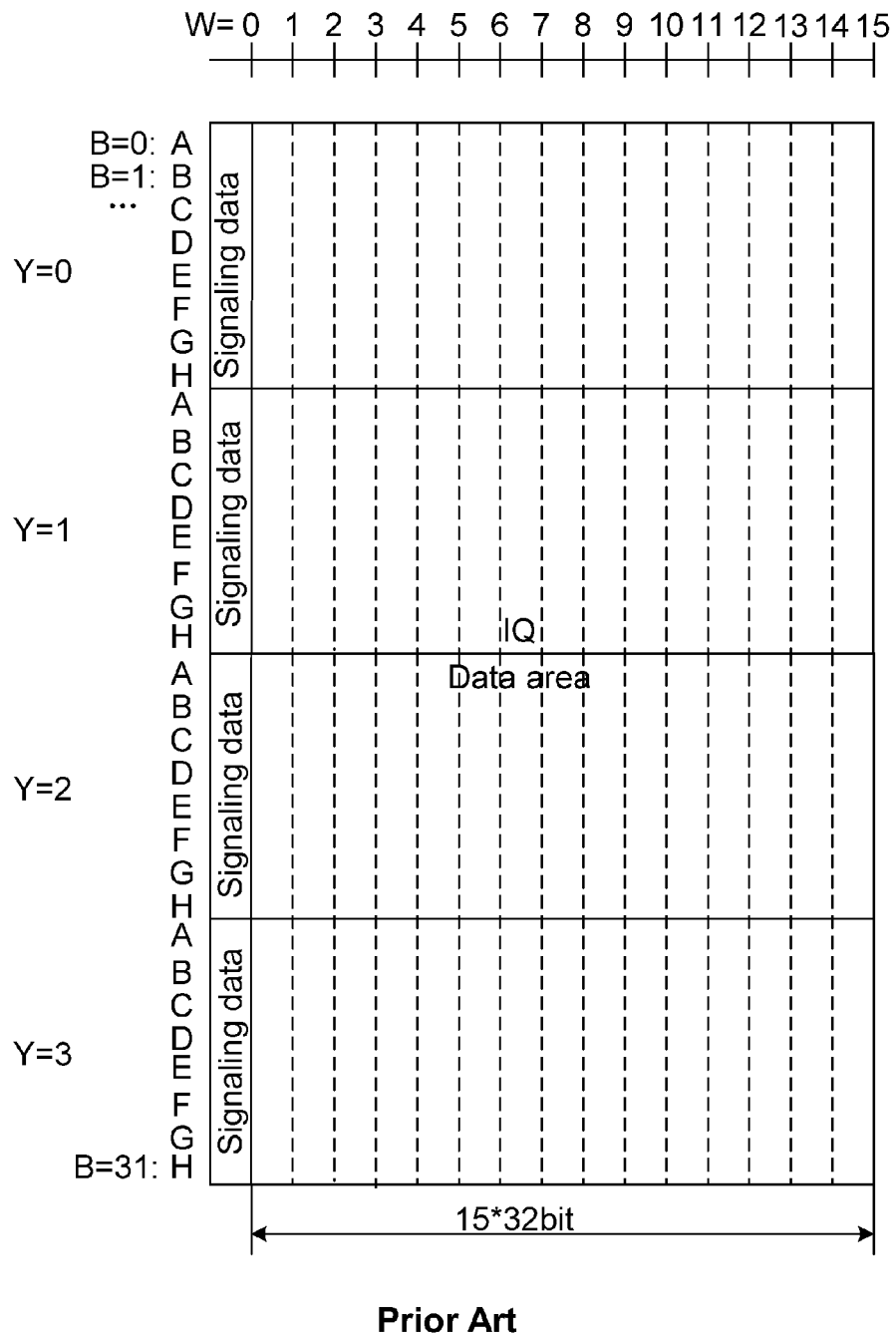
FIG. 2 is a structure diagram of CPRI base frame when the CPRI rate is 2.4576 Gbps.
Figure 3:
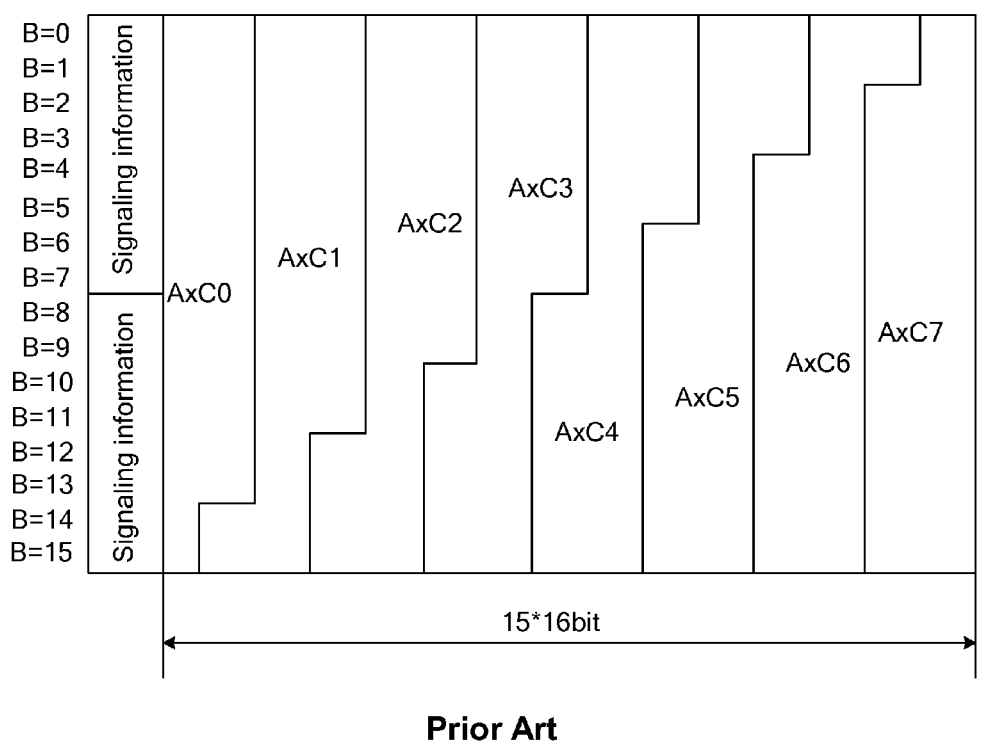
FIG. 3 is an A×C subchannel dividing diagram of CPRI base frame when the CPRI rate is 1.2288 Gbps.
Figure 4:
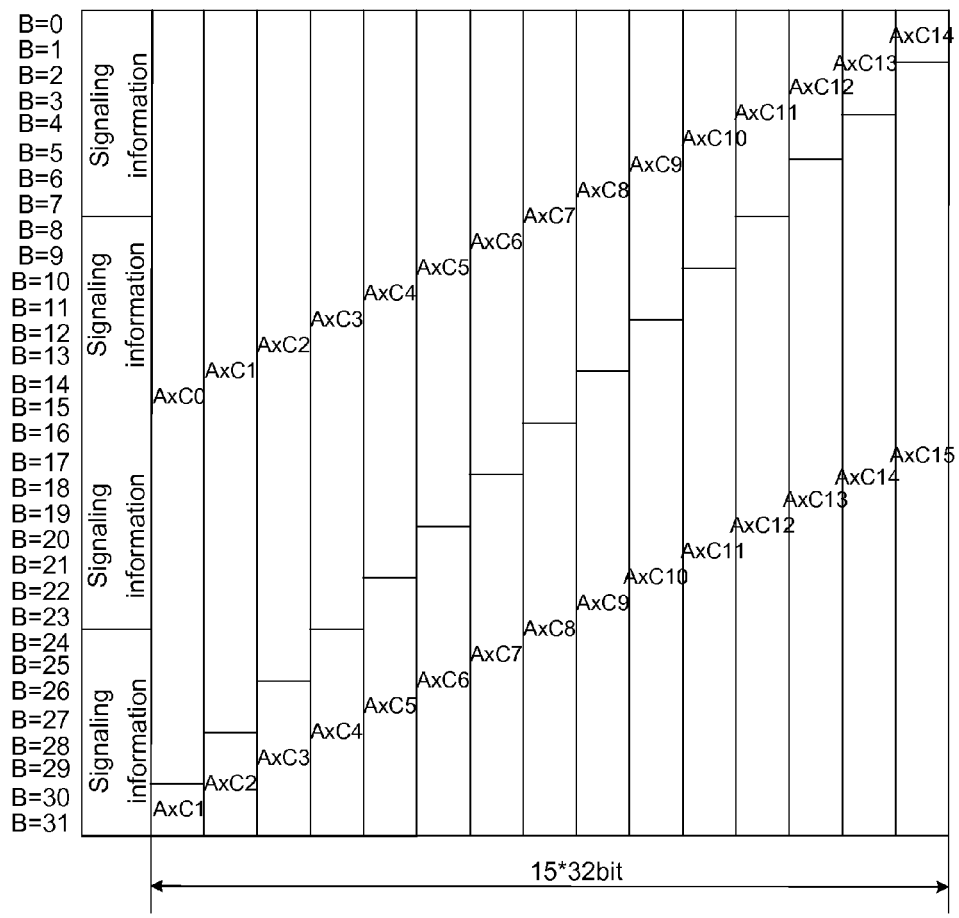
FIG. 4 is an A×C subchannel dividing diagram of CPRI base frame when the CPRI rate is 2.4576 Gbps.
Figure 5:
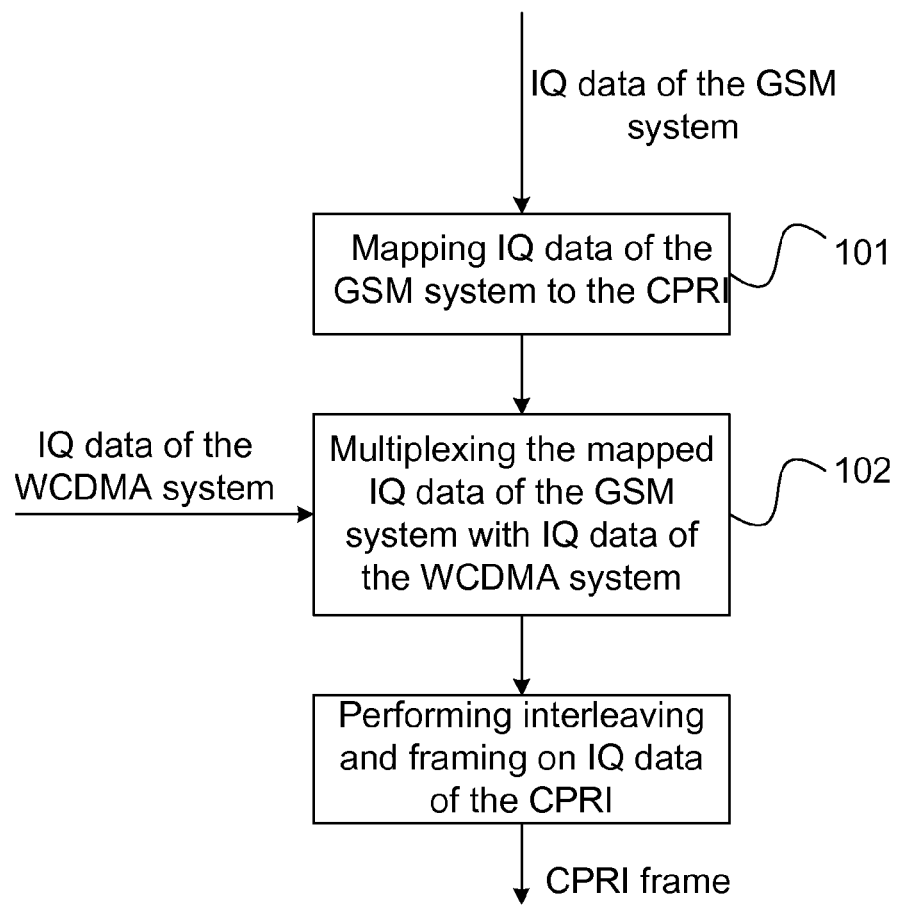
FIG. 5 is a flow diagram of a method for realizing the compatibility between a WCDMA system and a GSM system in downlink data path.

FIG. 5 shows a flow diagram of a method for realizing the compatibility between a WCDMA system and a GSM system in the downlink data path of the base station. It can be seen from FIG. 5 that, IQ data of the WCDMA system and the GSM system in the downlink data path are pre-framed before IQ data interleaving and framing in CPRI base frame, then the pre-framed IQ data are processed with IQ data interleaving and framing in CPRI with current technology to obtain a downlink CPRI frame. Specific steps for pre-framing IQ data in the downlink data path includes:

101, IQ data of GSM system are mapped to the CPRI, particularly including the following steps:

1) determining the amount of CPRI BFs transmitted in the duration of a super frame of the GSM system; and 2) upon ensuring integrity of CPRI BFs, the obtained CPRI BFs contained in the super frame of the GSM system are gradually divided according to regulation of GSM system, the amount of the CPRI BFs contained in each unit in the last grade is expressed as N, wherein N is a positive integer;

102, the mapped IQ data of the GSM system is multiplexed with IQ data of the WCDMA system, particularly including steps as following:

1) IQ data in one CPRI BF are multiplexed, the data area of each CPRI BF is divided into K A×C subchannels, wherein K is a positive integer; and 2) IQ data are multiplexed by using Y base frames of the CPRI as a multiplexing unit, wherein Y is a positive integer and N is exactly divided by Y.

After performing the aforementioned process on IQ data of the WCDMA system and the GSM system in the downlink data path of the base station, IQ data of the WCDMA system and the GSM system share a same CPRI data area, which realizes synchronized transmission of IQ data in the bottom layer and control words for two radio communication technologies via the WCDMA system and the GSM system.

Figure 6:
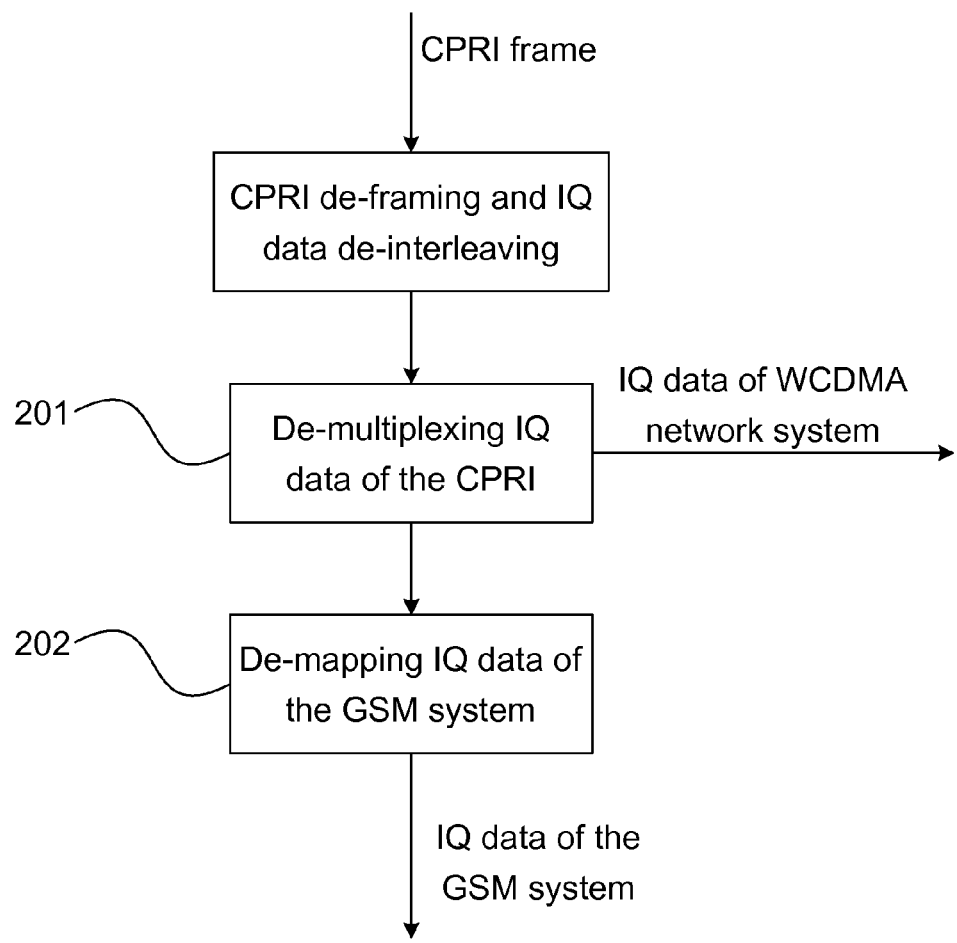
FIG. 6 is a flow diagram of a method for realizing the compatibility between a WCDMA system and a GSM system in the uplink data path.

In the downlink data path of the base station, the present invention realizes CPRI compatibility between downlink IQ data of the WCDMA system and downlink IQ data of the GSM system, while relative process on the uplink IQ data of the WCDMA system and the GSM system is performed in the uplink data path of the base station correspondingly, such that the CPRI compatibility between the WCDMA system and the GSM system can be genuinely realized. FIG. 6 shows a flow diagram of a method for realizing the compatibility between the WCDMA system and the GSM system in the uplink data path. It can be seen from the figure that, after de-framing and de-interleaving IQ data and the CPRI frame received by the base station, a secondary de-framing process is performed on the de-framed and de-interleaved IQ data to obtain IQ data of the WCDMA system and the GSM system. Secondary de-framing process on CPRI frame in uplink data path specifically includes the following steps:

201, IQ data of the CPRI are de-multiplexed after the de-framing and IQ data de-interleaving process; and 202, the de-multiplexed IQ data of the GSM system are de-mapped according to the predetermined rate in the downlink data path.

According to the aforementioned procedures, at different CPRI rates, such as 1.2288 Gbps or 2.4567 Gbps of the CPRI rate, the compatibility between the WCDMA system and the GSM system can be realized.

Realization of the aforementioned method of the invention is described below with reference of a preferred embodiment in detail.

In this embodiment, the CPRI rate is 1.2288 Gbps, firstly determining an uplink IQ data rate and a downlink IQ data rate of the GSM system utilized in the present invention, due to burst pulse is used for transmitting data according to the regulation of the GSM system, meanwhile data sampling rates of uplink and downlink burst pulses of the GSM system are different, which leads to different uplink and downlink IQ data rates of the GSM system. Therefore, in order to facilitate de-mapping IQ data in uplink data path which are mapped from the GSM system in the downlink data path to the CPRI, the larger one of the uplink and downlink IQ data rates of the GSM system is used as the uplink and downlink IQ data rates of the GSM network system while mapping according to the present invention.

Character rate of each burst pulse is 270.833 kbps according to regulation of current GSM system, and the duration of timeslot is 15/26 ms, approximately 577 μs, the number of characters transmitted within each timeslot of the GSM system is then 156.25. During uplink data sampling of the GSM system, I data of each sampling point is 26 bits, Q data is 26 bits, and a sampling point of a burst pulse is 104 bits with single-time sampling plus main diversity. Thus, the IQ data of a burst pulse in the uplink data path are $$104 \times 156.25 = 16250 \text{ bits} \quad (1)$$

Then, the uplink IQ data rate of the GSM system is $$\frac{26 \times 2 \times 2 \times 156.25}{15/26} = 28.2 \text{ Mbps} \quad (2)$$

In the downlink data sampling, a sampling point contains the I data of 14 bits and the Q data of 14 bits, the IQ data are 112 bits through 4-time oversampling, and then IQ data of a burst pulse are $$112 \times 156.25 = 17500 \text{ bits} \quad (3)$$

Then, the downlink IQ data rate of the GSM system is $$\frac{14 \times 2 \times 4 \times 156.25}{15/26} = 30.3 \text{ Mbps} \quad (4)$$

Downlink IQ data rate of the GSM system is larger than uplink IQ data rate, not only because the data sampling rates of burst pulse are different, but also the downlink burst pulse is accompanied by some function control message and Phase-Locked Loop (PLL) information that occupy 3 bytes. To assure that the uplink IQ data rate and the downlink IQ data rate of the GSM system match, the embodiment of the present invention defines that both the uplink IQ data rate and the downlink IQ data rate of the GSM system are 30.3 Mbps.

Figure 7:
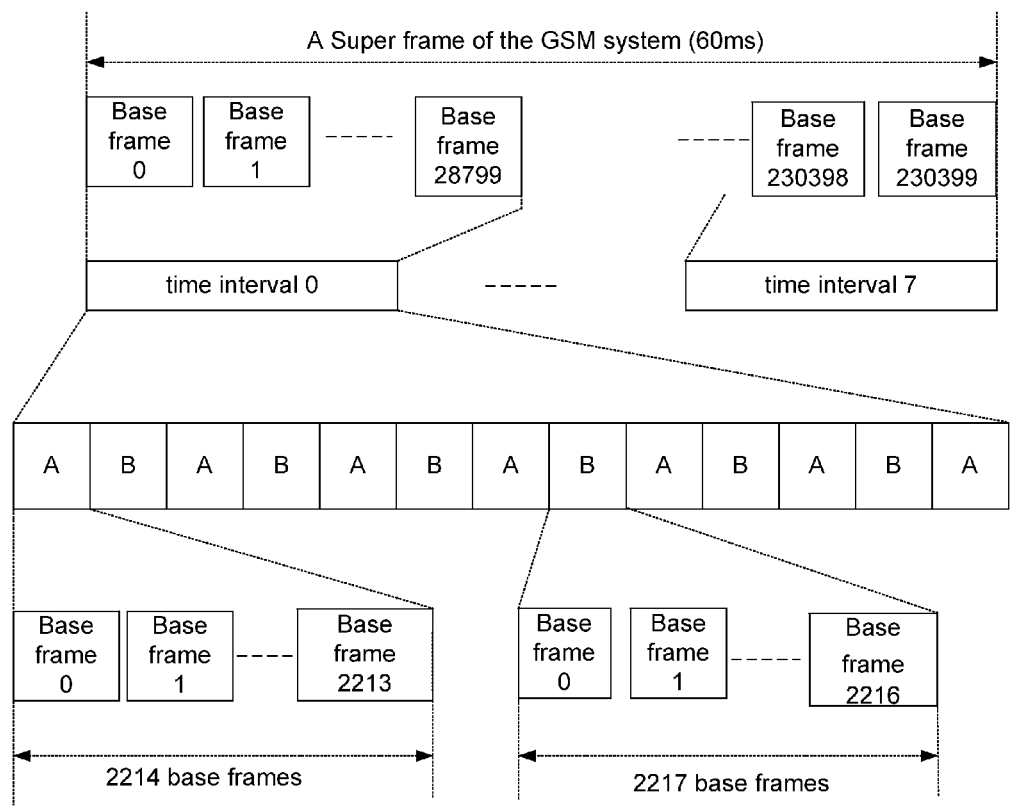
FIG. 7 is a mapping diagram of a preferred embodiment of a method for realizing the compatibility between a WCDMA system and a GSM system.

In the downlink data path of the base station, IQ data of the WCDMA system and the GSM system received by the base station are pre-framed via the following steps in detail:

301, IQ data of the GSM system are mapped to the CPRI, particularly including the following steps:

1) determining the amount of the CPRI BFs transmitted within the duration of a super frame of the GSM system in order to map IQ data of the GSM system to the CPRI; the duration of a CPRI BF is 25/96 μs, the duration of a super frame of the GSM system is 60 ms, i.e., the sum of the durations of 230400 CPRI BFs, therefore, it can be seen that the CPRI transmits 230400 CPRI BFs within the time of 60 ms; and 2) upon ensuring the integrity of the CPRI BF, the CPRI BFs transmitted within the duration of a super frame of the GSM system are gradually divided. A super frame contains 13 TDMA frames, each TDMA frame contains 8 timeslots, and each timeslot is used for transmitting a burst pulse, that is, a TDMA frame can transmits 8 path IQ data of the GSM network. Therefore, CPRI BFs transmitted within the duration of a super frame of the GSM system can be divided according to the method shown in FIG. 7. It can be seen from FIG. 7 that, the first grade division divides the super frame of the GSM system into 8 time intervals, then 28800 CPRI BFs can pass within each time interval; and the second grade division divides each time interval into 13 messages, then 215.384 CPRI BFs is allocated in each message. To ensure the integrity of the BF, the forementioned 13 messages are finally divided into type A and type B, wherein 7 messages belong to type A message and the other 6 messages belong to type B message, and each type A message contains 2214 CPRI BFs and each type B message contains 2217 CPRI BFs. The arrangement of the type A messages and the type B messages in one time interval is: ABABABABABABA, wherein the type A messages and the type B messages can be arranged by other methods. While performing a division, the 13 messages in one time interval can be divided into several types according to other methods, and arrangement of divided messages can be various; however, the amount of the BFs contained by each type shall be ensured as a positive integer and the positive integer must be integral multiple of the amount of the BFs contained in one multiplexing unit.

It can be seen from the predetermined uplink IQ data rate and downlink IQ data rate of the GSM system that, IQ data of the GSM system are transmitted at rate of 30.3 Mbps in both uplink and downlink data paths, and the CPRI rate of the embodiment of the present invention reaches up to 1.2288 Gbps, therefore, IQ data of the GSM system can multiplex an IQ data channel in IQ data area of multiple CPRIs.

Figure 8:
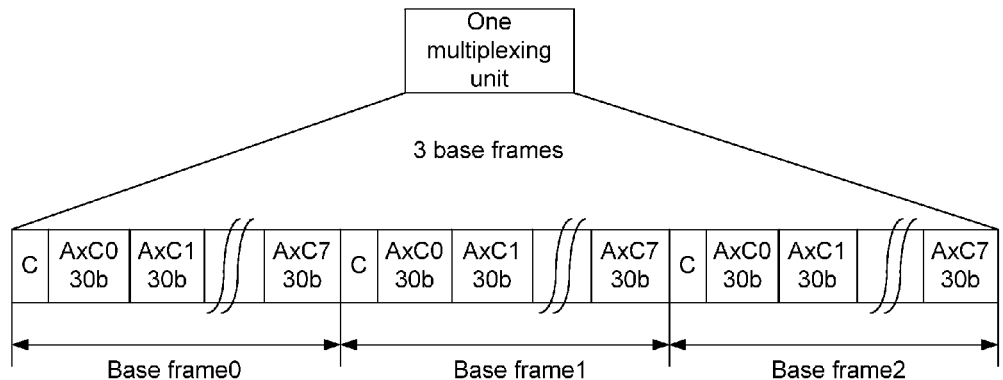
FIG. 8 is a structure diagram of a multiplexing unit of an embodiment of the present invention.

302, the mapped IQ data of the GSM system are multiplexed with IQ data of the WCDMA system, specifically including the following steps:

1) dividing IQ data area of each BF of the CPRI into 8 A×C subchannels, the capacity of each A×C subchannel is fixed at 30 bits, thus each A×C subchannel of the CPRI BF can transmit 1 path of IQ data of the GSM system; accordingly, when 8 A×C subchannels of the CPRI are all used for transmitting IQ data of the GSM system, the BFs of one CPRI can transmit 8 paths of the IQ data of the GSM system at most for once; and 2) performing secondary multiplexing on the CPRI to more efficiently utilize the CPRI transmission resources. FIG. 8 shows a multiplexing unit of an embodiment of the present invention; it can be seen from FIG. 8 that, 3 CPRI BFs act as a multiplexing unit in the embodiment of the present invention, the same A×C subchannel of each BF in the multiplexing unit is used for transmitting IQ data of the same radio transmission mode, and control layer adjusts radio transmission mode of each A×C subchannel of each multiplexing unit at any time according to the amount of IQ data of the WCDMA system and the GSM system transmitted in the downlink data path of the base station. After the secondary multiplexing process, it can be seen that, if all A×C subchannels of the multiplexing unit are used for transmitting IQ data of the GSM system, 24 paths of the IQ data of the GSM system can be transmitted at most in one multiplexing unit.

As shown in the table below, in order to facilitate multiplexing IQ data of the WCDMA system and the GSM system, the IQ data to be transmitted by the multiplexing unit are transmitted via 24 IQ data channels according to the mapping relationship between the GSM system and the CPRI, and then the 24 IQ data channels are divided into 8 Blocks corresponding to 8 A×C subchannels of the CPRI BFs.

| Block0 | Block1 | Block2 | Block3 | Block4 | Block5 | Block6 | Block7 |
|---|---|---|---|---|---|---|---|
| $IQ_0$ | $IQ_3$ | $IQ_6$ | $IQ_9$ | $IQ_{12}$ | $IQ_{15}$ | $IQ_{18}$ | $IQ_{21}$ |
| $IQ_1$ | $IQ_4$ | $IQ_7$ | $IQ_{10}$ | $IQ_{13}$ | $IQ_{16}$ | $IQ_{19}$ | $IQ_{22}$ |
| $IQ_2$ | $IQ_5$ | $IQ_8$ | $IQ_{11}$ | $IQ_{14}$ | $IQ_{17}$ | $IQ_{20}$ | $IQ_{23}$ |

Wherein, $IQ_0$, $IQ_3$, $IQ_6$, $IQ_9$, $IQ_{12}$, $IQ_{15}$, $IQ_{18}$ and $IQ_{21}$ are fixedly configured as the channels for transmitting IQ data of the WCDMA system, that is, if the data are IQ data of the WCDMA system, IQ data of the WCDMA system can only be transmitted by one of the abovementioned 8 channels, 8 paths of IQ data of the WCDMA system can be transmitted at most in one multiplexing unit; and if the data are IQ data of the GSM system, IQ data of the GSM system can be transmitted by any one or more Blocks from Block0 to Block7, each Block can transmit 3 paths of the IQ data of the GSM system, and each multiplexing unit can transmit 24 paths of the IQ data of the GSM system. Meanwhile, if IQ data of the WCDMA system are transmitted via a channel used for transmitting IQ data of the WCDMA system in certain Block, the other two channels of the Block are automatically suspended, and the system can perform modulus-3 counting to the BF. So, IQ data of the GSM system can be multiplexed in one multiplexing unit.

When multiplexing the downlink IQ data of the WCDMA system and the GSM system, if the radio transmission modes from A×C0 subchannel to A×C7 subchannel of the CPRI BF in one multiplexing unit specified by the control layer are shown as the table below:

| A×C0 | A×C1 | A×C2 | A×C3 | A×C4 | A×C5 | A×C6 | A×C7 |
|---|---|---|---|---|---|---|---|
| W mode | G mode | W mode | G mode | G mode | W mode | G mode | W mode | then in one multiplexing unit, IQ data transmitted by each A×C subchannel of 3 CPRI BFs are shown as the table below:

|  | A×C0 | A×C1 | A×C2 | A×C3 | A×C4 | A×C5 | A×C6 | A×C7 |
|---|---|---|---|---|---|---|---|---|
| BF0 | $IQ_0$ | $IQ_3$ | $IQ_6$ | $IQ_9$ | $IQ_{12}$ | $IQ_{15}$ | $IQ_{18}$ | $IQ_{21}$ |
| BF1 | $IQ_0$ | $IQ_4$ | $IQ_6$ | $IQ_{10}$ | $IQ_{13}$ | $IQ_{15}$ | $IQ_{19}$ | $IQ_{21}$ |
| BF2 | $IQ_0$ | $IQ_5$ | $IQ_6$ | $IQ_{11}$ | $IQ_{14}$ | $IQ_{15}$ | $IQ_{20}$ | $IQ_{21}$ |

That is, when A×C0 subchannel is used for transmitting IQ data of the WCDMA system, IQ data of $IQ_0$ channel of Block0 are transmitted via A×C0 subchannel in BF0, BF1 and BF2 frames in a multiplexing unit, while $IQ_1$ and $IQ_2$ channels of Block0 are suspended. When A×C1 subchannel is used for transmitting IQ data of the GSM system, IQ data in $IQ_3$, $IQ_4$ and $IQ_5$ channels of Block1 are transmitted via A×C1 subchannel in BF0, BF1 and BF2 frames in one multiplexing unit.

After performing the above processing to IQ data of the WCDMA system and the GSM system received in the downlink data path of the base station, IQ data of the aforementioned two systems shall be interleaved according to a CPRI protocol during the process for framing CPRI frame, then IQ data of the WCDMA system and the GSM system shall be on the same mode, such that the compatibility between the WCDMA system and the GSM system in the downlink data path of the base station is realized.

By utilizing the method for realizing the compatibility between the WCDMA system and the GSM system in the downlink data path of the base station, the received CPRI frames shall be processed correspondingly in the uplink data path of the base station in order to genuinely realize the compatibility between the WCDMA system and the GSM system.

A secondary de-framing process on the CPRI frame in the uplink data path of the base station specifically includes the following steps:

401, de-multiplexing IQ data of the CPRI frame after de-framing and IQ data de-interleaving process according to the type of radio transmission mode in each A×C subchannel of each forementioned multiplexing unit configured by the control layer; and

402, according to the predetermined rate in the downlink data path of the base station, de-mapping IQ data of the GSM system which is de-multiplexed in step 401.

After the IQ data in the multiplexing unit of the embodiment are de-multiplexed and de-mapped, IQ data of the WCDMA system transmitted in A×C0 subchannel are transmitted to $IQ_0$ channel; IQ data transmitted via A×C1 subchannel are transmitted to $IQ_3$ channel when BF=0; IQ data transmitted via A×C1 subchannel are transmitted to $IQ_4$ channel when BF=1; and IQ data transmitted via A×C1 subchannel are transmitted to $IQ_5$ channel when BF=2.

Figure 9:
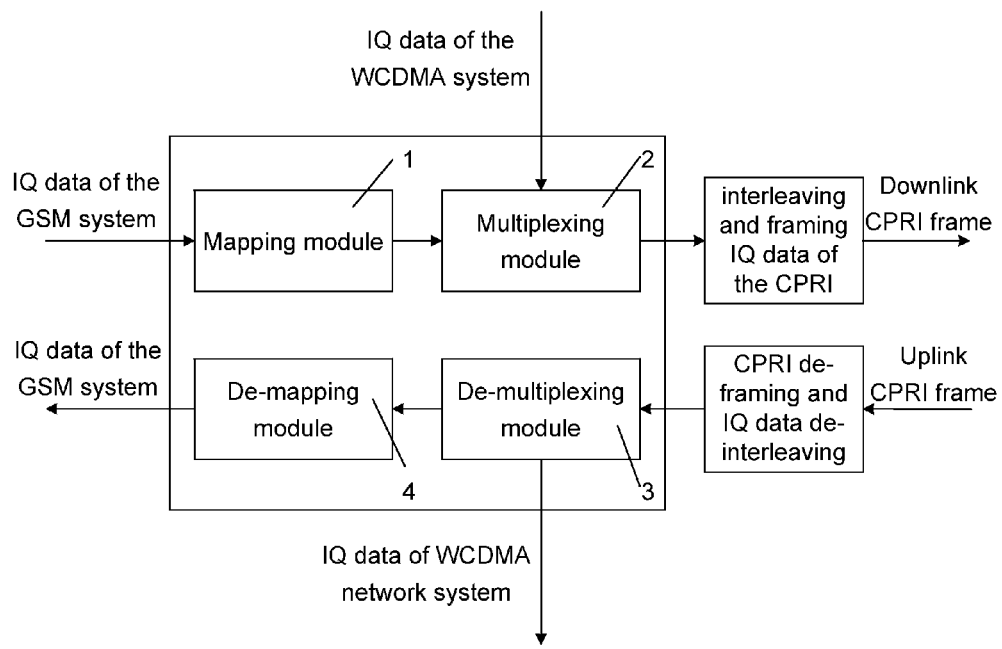
FIG. 9 is a structure diagram of the apparatus for realizing the compatibility between a WCDMA system and a GSM system.

Corresponding to the aforementioned method, the present invention further provides an apparatus for realizing compatibility between a WCDMA system and a GSM system. FIG. 9 shows a structure diagram of the apparatus, the apparatus includes a mapping module 1 and a multiplexing module 2 in a downlink data path, and a de-multiplexing module 3 and a de-mapping module 4 in an uplink data path, wherein the mapping module 1 is used for mapping IQ data of the GSM system received in the downlink data path of a base station to the CPRI;

the multiplexing module 2 is used for multiplexing IQ data of the GSM system mapped by the mapping module 1 with IQ data of the WCDMA system received by the base station;

the de-multiplexing module 3 is used for de-multiplexing IQ data of CPRI frame after de-framing and IQ data de-interleaving process in the uplink data path of the base station; and the de-mapping module 4 is used for de-mapping the IQ data of the GSM system de-multiplexed by the de-multiplexing module 3 according to the predetermined rate in the downlink data path of the base station.

Figure 10:
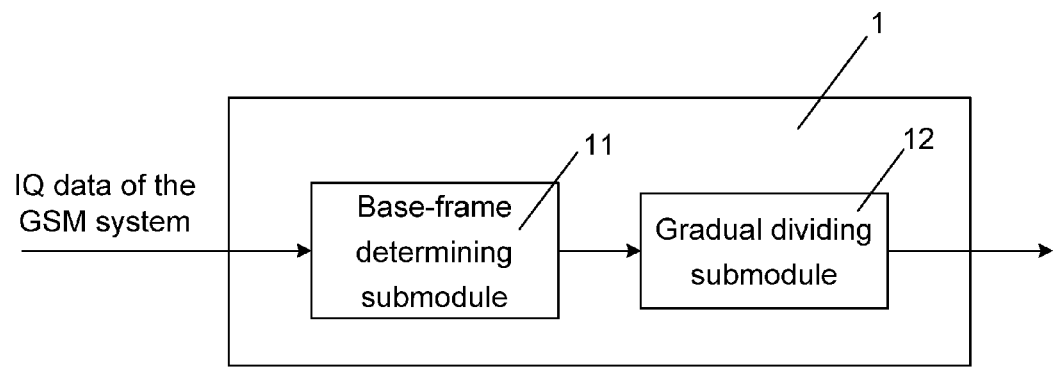
FIG. 10 is a structure diagram of the mapping module of the apparatus for realizing the compatibility between a WCDMA system and a GSM system.

As shown in FIG. 10, the mapping module 1 includes:

a base-frame determining submodule 11, which is used for determining the amount of the CPRI BFs transmitted during the duration of a super frame of the GSM system; and a gradual dividing submodule 12, which is used for gradually dividing the amount of CPRI BFs determined by the base frame determining module 11.

Figure 11:
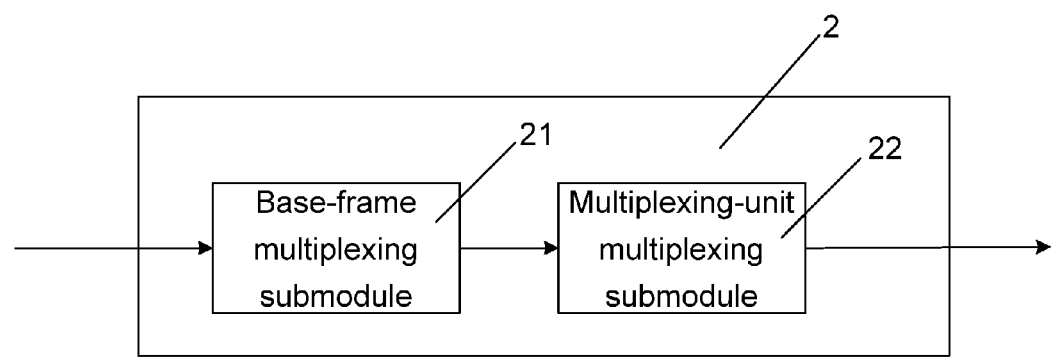
FIG. 11 is a structure diagram of the multiplexing module of the apparatus for realizing the compatibility between a WCDMA system and a GSM system.

As shown in FIG. 11, the multiplexing module 2 includes:
a base-frame multiplexing submodule 21, which is used for multiplexing IQ data of the WCDMA system and the GSM system in one CPRI BF; and
a multiplexing-unit multiplexing submodule 22, which is used for multiplexing IQ data of the WCDMA system and the GSM system in one multiplexing unit.

Obviously, for those skilled in the art, the present invention may have various modifications and changes. Thus, any modifications, equivalent replacements, improvements and the like within the spirit and principle of the invention shall fall within the scope of the present invention.

INDUSTRIAL APPLICABILITY

With utilization of the aforementioned technical solutions, the present invention genuinely realizes the compatibility between the WCDMA system and the GSM system in physical layer by unifying two different radio transmission modes of the WCDMA system and the GSM system in the bottom layer.

The invention claimed is:

1. A method for realizing compatibility between a Wideband Code Division Multiple Access (WCDMA) system mode and a Global System for Mobile Communication (GSM) system mode, comprising the following steps:
A. in a downlink data path of a base station, mapping In-phase/Quadrature (IQ) data of the GSM system to a Common Public Radio Interface (CPRI) to make the ratio between the mapped IQ data rate of the GSM system and the CPRI basic frame rate to be a constant, multiplexing the mapped IQ data of the GSM system with IQ data of the WCDMA system, before IQ data interleaving and framing a CPRI base frame; and
B. in an uplink data path of the base station, de-multiplexing the mapped IQ data of the GSM system and the IQ data of the WCDMA system after performing de-framing and IQ data de-interleaving on CPRI base frames, and de-mapping the de-multiplexed IQ data of the GSM system according to the predetermined rate;
wherein, the mapping comprises:
determining amount of CPRI base frames transmitted in duration of a super frame of the GSM system; and
gradually dividing the CPRI base frames transmitted in the duration of the super frame, wherein the amount of CPRI base frames contained in each unit in the last grade is N, wherein N is a positive integer; wherein the multiplexing comprises:
dividing data area of each CPRI base frame into K Antenna-Carrier (A×C) subchannels, wherein K is a positive integer; and
using Y CPRI base frames as a multiplexing unit, and multiplexing in the multiplexing unit the mapped IQ data of the GSM system with the IQ data of the WCDMA system by mapping the mapped IQ data of the GSM system and the IQ data of the WCDMA system to corresponding subchannels according to the radio transmission modes, wherein Y is a positive integer, and N is divided by Y;
the method further comprising:
adjusting, by a control layer, the radio transmission modes of the K A×C subchannels in the multiplexing unit according to data amount of the WCDMA system and data amount of the GSM system transmitted in the downlink data path of the base station.

2. The method according to claim 1, wherein the predetermined rate is the larger one of a downlink IQ data rate and an uplink IQ data rate of the GSM system.

3. The method according to claim 1, wherein the gradually dividing the CPRI base frames comprises:
dividing the super frame of the GSM system into 8 time intervals;
dividing each time interval into 13 messages; and
dividing the 13 messages into type A and type B, wherein 7 messages belong to type A message and the other 6 messages belong to type B message, and each type A message contains 2214 CPRI base frames and each type B message contains 2217 CPRI base frames.

4. The method according to claim 3, wherein IQ data of the same radio transmission mode are transmitted via the same A×C subchannel of each base frame in one multiplexing unit.

5. An apparatus for realizing compatibility between a Wideband Code Division Multiple Access (WCDMA) system mode and a Global System for Mobile Communication (GSM) system mode, comprising:
a mapping module, configured to map In-phase/Quadrature (IQ) data of the GSM system received by a base station in a downlink data path to a Common Public Radio Interface (CPRI) to make the ratio between the mapped IQ data rate of the GSM system and the CPRI basic frame rate to be a constant;
a multiplexing module, configured to divide data area of each CPRI base frame into K Antenna-Carrier (A×C) subchannels; and use Y CPRI base frames as a multiplexing unit, and multiplex in the multiplexing unit the mapped IQ data of the GSM system with IQ data of the WCDMA system received by the base station in the downlink data path, by mapping the mapped IQ data of the GSM system and the IQ data of the WCDMA system to corresponding subchannels according to the radio transmission modes of the subchannels configured by a control layer, wherein both K and Y are positive integers;
wherein the multiplexing module further comprises:
the control layer adjusting the radio transmission modes of the K A×C subchannels in the multiplexing unit according to data amount of the WCDMA system and data amount of the GSM system transmitted in the downlink data path of the base station;
a de-multiplexing module, configured to de-multiplex IQ data of the CPRI comprising the mapped IQ data of the GSM system and the IQ data of the WCDMA system in an uplink data path after being de-framed and IQ data de-interleaved; and
a de-mapping module, configured to de-map uplink IQ data of the GSM system de-multiplexed by the de-multiplexing module in the uplink data path according to the predetermined rate; and
wherein the mapping module comprises:
a base-frame amount determining submodule, configured to determine amount of CPRI base frames transmitted in the duration of a super frame of the GSM system; and
a gradual dividing submodule, configured to gradually divide the amount of CPRI base frames transmitted in the duration of the super frame of the GSM system determined by the base-frame amount determining submodule, wherein the amount of CPRI base frames contained in each unit in the last grade is N, wherein N is a positive integer and is divided by Y.

6. The apparatus according to claim 5, wherein gradually dividing the CPRI base frames comprises:
dividing the super frame of the GSM system into 8 time intervals;

dividing each time interval into 13 messages; and
dividing the 13 messages into type A and type B, wherein 7 messages belong to type A message and the other 6 messages belong to type B message, and each type A message contains 2214 CPRI base frames and each type B message contains 2217 CPRI base frames.

7. The apparatus according to claim 5, wherein the predetermined rate is the larger one of a downlink IQ data rate and an uplink IQ data rate of the GSM system.

\* \* \* \* \*